United States Patent
Kondoh et al.

(10) Patent No.: US 10,807,910 B2
(45) Date of Patent: Oct. 20, 2020

(54) CEMENTITIOUS MATERIAL FOR RADIOACTIVE WASTE DISPOSAL FACILITY

(71) Applicants: Katsuyoshi Kondoh, Osaka (JP); NIPPON STEEL & SUMIKIN CEMENT CO., LTD., Hokkaido (JP)

(72) Inventors: Katsuyoshi Kondoh, Osaka (JP); Hitoshi Kanbara, Hokkaido (JP); Tomohiro Kanazawa, Hokkaido (JP); Seunghyun Na, Hokkaido (JP); Nana Nishikawa, Hokkaido (JP)

(73) Assignees: Katsuyoshi Kondoh, Osaka (JP); NIPPON STEEL CEMENT CO., LTD., Hokkaido (JP)

( * ) Notice: Subject to any disclaimer, the term of this patent is extended or adjusted under 35 U.S.C. 154(b) by 372 days.

(21) Appl. No.: 15/747,788

(22) PCT Filed: Jun. 20, 2016

(86) PCT No.: PCT/JP2016/068213
§ 371 (c)(1),
(2) Date: Aug. 7, 2018

(87) PCT Pub. No.: WO2017/022345
PCT Pub. Date: Feb. 9, 2017

(65) Prior Publication Data
US 2020/0079693 A1    Mar. 12, 2020

(30) Foreign Application Priority Data

Jul. 31, 2015    (JP) .................................. 2015-151830

(51) Int. Cl.
| | | |
|---|---|---|
| *C04B 20/00* | (2006.01) | |
| *C04B 14/04* | (2006.01) | |
| *C04B 14/30* | (2006.01) | |
| *C04B 28/02* | (2006.01) | |
| *G21F 9/34* | (2006.01) | |
| *C04B 111/00* | (2006.01) | |
| *C04B 111/70* | (2006.01) | |

(52) U.S. Cl.
CPC ............ *C04B 20/004* (2013.01); *C04B 14/04* (2013.01); *C04B 14/30* (2013.01); *C04B 14/304* (2013.01); *C04B 28/02* (2013.01); *G21F 9/34* (2013.01); *C04B 2111/00862* (2013.01); *C04B 2111/70* (2013.01)

(58) Field of Classification Search
CPC ....... C04B 14/04; C04B 14/30; C04B 14/304; C04B 20/004; C04B 28/02; C04B 2111/00862; C04B 2111/70; G21F 9/34
See application file for complete search history.

(56) References Cited

U.S. PATENT DOCUMENTS

2008/0017077 A1    1/2008    Abate

FOREIGN PATENT DOCUMENTS

| | | |
|---|---|---|
| CN | 101528601 | 9/2009 |
| JP | 59-78968 | 5/1984 |
| JP | 4-219353 | 8/1992 |
| JP | 05-194007 | 8/1993 |
| JP | 07-33249 | 4/1995 |
| JP | 2941269 | 8/1999 |
| JP | 2000-065992 | 3/2000 |
| JP | 2001-294471 | 10/2001 |
| JP | 2001-316145 | 11/2001 |
| JP | 2003-290734 | 10/2003 |
| JP | 4524721 | 8/2010 |
| JP | 2011-059044 | 3/2011 |
| JP | 2011-196806 | 10/2011 |
| JP | 2012140522 A * | 7/2012 |
| JP | 2012-224694 | 11/2012 |
| KR | 10-2015-0024839 | 3/2015 |
| WO | 2008/053711 | 5/2008 |
| WO | WO-2011064815 A1 * | 6/2011 ........... C04B 18/101 |

OTHER PUBLICATIONS

Machine Translation of Japanese Patent Specification No. JP 05-194007 A (Year: 1993).*
Machine Translation of Japanese Patent Specification No. JP 2001-294471 A (Year: 2001).*
Ichiro Wada et al., "Effect of High-Reactive . . . Strength Properties of Concrete", Japan Concrete Institute, 1999, vol. 21, No. 2, pp. 175-180.
Hu Yunzhen et al., "Research and Application . . . Cement and Concrete", Department of Architectural Engineering, Chenzhou Vocational College, Chenzhou, vol. 28, May 2014, p. 348-350.

* cited by examiner

*Primary Examiner* — Anthony J Green
(74) *Attorney, Agent, or Firm* — Clark & Brody LP

(57) ABSTRACT

The cementitious material for a radioactive waste disposal facility includes base cement, and porous and amorphous silica powder. The amount of the silica powder in the entire cementitious material ranges from 35% to 65% on a mass basis.

9 Claims, 1 Drawing Sheet

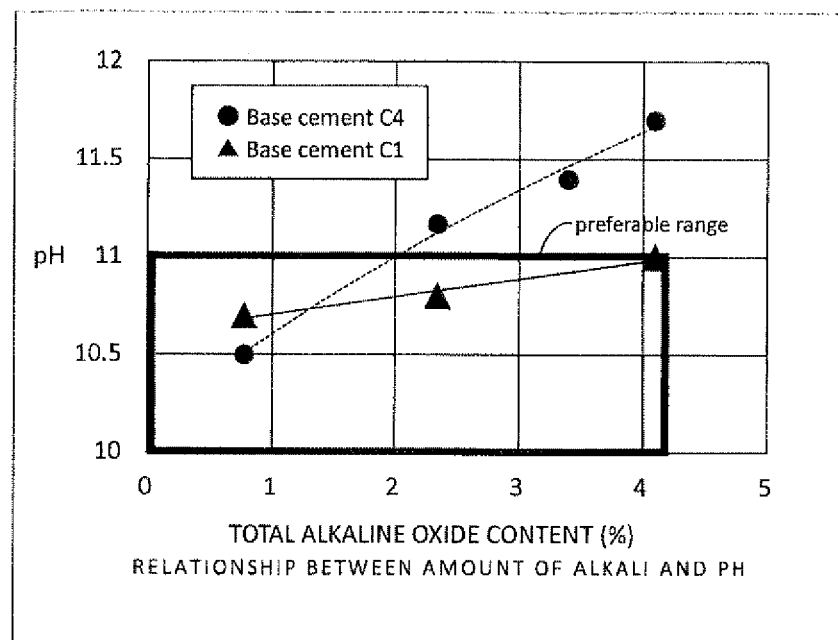

CEMENTITIOUS MATERIAL FOR RADIOACTIVE WASTE DISPOSAL FACILITY

TECHNICAL FIELD

This invention relates to a cementitious material which is a material of structures making up a radioactive waste disposal facility, and a grouting material to be injected into the ground for ground improvement where the radioactive waste disposal facility is to be built.

BACKGROUND ART

High-level radioactive waste needs to be buried in a radioactive waste disposal facility built in a deep geological formation at a depth of 350 meters or deeper in order to ensure safety for at least several tens of thousands of years. Low-level radioactive waste is buried in concrete pits or other types of containers 50 to 100 meters underground and controlled for several hundreds of years.

Building of a radioactive waste disposal facility begins with injection of a grouting material into rock fractures of a deep geological formation at a depth of 350 meters or deeper to block water and stabilize a rock mass at a time. Then, a tunnel of over 100 km is excavated in the stabilized deep geological formation, and shafts are formed at a few meters apart in the tunnel. High-level radioactive waste enclosed in a capsule is buried in each of the shafts.

The tunnel is surrounded by supporting concrete or other types of supporting materials, while the shafts with the capsules of high-level radioactive waste are sealed with bentonite. Thus, the bentonite (artificial barrier) and the rock mass (natural barrier) enclose the encapsulated high-level radioactive waste to prevent groundwater contamination.

It is common to add silica powder (silicon dioxide) as an admixture to raw cement for the purpose of increasing the densities of the grout, supporting concrete and so on. The silica in the cement reacts (pozzolanic reaction) with calcium hydroxide generated by a hydration reaction, thereby making the hardened cement body denser.

There are some related art documents about cementitious materials or grouting materials for a radioactive waste disposal facility: Japanese Unexamined Patent Application Publications No. 2000-65992 (PTL 1); No. 2003-290734 (PTL 2); No. 2011-59044 (PTL 3); No. 2011-196806 (PTL 4); and No. 2012-224694 (PTL 5).

The cementitious material disclosed in PTL 1 (Japanese Unexamined Patent Application Publication No. 2000-65992) contains siliceous admixtures, such as fly ash and silica fume. PTL 2 (Japanese Unexamined Patent Application Publication No. 2003-290734) explains that a silica-based buffer layer is interposed at a boundary between a bentonite-based material layer and a cementitious material layer. The silica-based buffer layer is composed of a powder selected from silica fume, fly ash, ferrous smelting slag, non-ferrous smelting slag, and so on.

PTL 3 (Japanese Unexamined Patent Application Publication No. 2011-59044) discloses an injection material containing fine spherical silica powder and fine slaked lime powder. The spherical silica is silica spheres obtained by melting a siliceous material in high-temperature air currents. The injection material disclosed in PTL 4 (Japanese Unexamined Patent Application Publication No. 2011-196806) also contains silica spheres obtained by melting a siliceous material in high-temperature air currents. PTL 5 (Japanese Unexamined Patent Application Publication No. 2012-224694) discloses a water-blocking filler mainly containing sodium bentonite obtained by mixing 30 weight % or less, in terms of inner percentage, of a pozzolan substance. The pozzolan substance is fly ash or silica fume.

As seen in the above patent literature, typically ingredients of silica powder in the cementitious materials or grouting materials used to build radioactive waste disposal facilities are conventionally fly ash, silica fume, or some other substances. Fly ash is composed of spherical fine particles blown up with coal combustion gas at thermal power plants, and silica fume is composed of spherical fine particles contained in exhaust gas produced during refinement of metallic silicon and ferrosilicon in electric furnaces.

Although it may be of little relevance to the radioactive waste disposal facilities, attempts to use ash left after the burning of a plant material, such as rice husk, as a cement admixture have been made. Japanese Patent Publication No. 4524721 (PTL 6) discloses a high compressive-strength cement composition containing a large amount of rice husk ash, which is industrial waste. Japanese Unexamined Patent Application Publication No. H5(1993)-194007 (PTL 7) discloses a concrete product mixed with fine amorphous silica powder made from rice husk.

CITATION LIST

Patent Literature

PTL 1: Japanese Unexamined Patent Publication No. 2000-65992

PTL 2: Japanese Unexamined Patent Publication No. 2003-290734

PTL 3: Japanese Unexamined Patent Publication No. 2011-59044

PTL 4: Japanese Unexamined Patent Publication No. 2011-196806

PTL 5: Japanese Unexamined Patent Publication No. 2012-224694

PTL 6: Japanese Patent No. 4524721

PTL 7: Japanese Unexamined Patent Publication No. H5(1993)-194007

SUMMARY OF INVENTION

Technical Problem

There is rising concern that alkaline materials, such as cement, may cause loss of bentonite barrier function and alteration of rock mass quality at geological disposal sites for high-level radioactive waste. To eliminate the concern, materials used to build the radioactive waste disposal facilities are required to have a low alkalinity with a pH less than 11.

An effective method to maintain low alkalinity is to induce reaction between a highly-active siliceous material and calcium hydroxide produced by hydrating cement, and therefore, a pozzolan substance, such as silica fume and fly ash, is utilized for conventional cementitious materials and grouting materials for radioactive waste disposal facilities. However, the materials containing silica fume or fly ash take time to lower the pH, and have problems in early strength development.

Silica powder extracted from ash obtained by burning a plant material, such as rice husk, through a specific process has a porous and amorphous structure, which is highly reactive to calcium hydroxide, and has good reaction activity. Consequently, the amorphous and porous silica powder derived from a plant material is expected to be more suitable for proceeding pozzolanic reaction.

The inventors of the present invention studied whether the plant-material derived silica powder is adaptable for use as silica contained in cementitious materials or grouting materials for radioactive waste disposal facilities.

An object of the present invention is to provide a cementitious material for a radioactive waste disposal facility, that decreases the pH at an early stage after hardening to thereby have excellent early strength properties.

Another object of the present invention is to provide a grouting material for a radioactive waste disposal facility, that decreases the pH at an early stage after hardening to thereby have excellent early strength properties, and can permeate into minute spaces between fine particles in the ground and cracks in the rock mass.

Solution to Problem

The cementitious material for a radioactive waste disposal facility according to the present invention includes base cement, and porous and amorphous silica powder. The amount of the silica powder in the entire cementitious material ranges from 35% to 65% on a mass basis.

Preferably, the silica powder contains an alkaline oxide, and the total alkaline oxide content of the entire silica powder is 4.1% or lower on a mass basis. The total alkaline oxide content is preferably 3.0%, more preferably 2.0%, and still more preferably 1.6%.

Preferably, the silica powder has a silica purity of 93% or higher on a mass basis.

In order to reduce the total amount of the alkaline component contained in the silica powder, the silica powder is preferably an ash obtained by soaking a plant material in an acid solution or heated water to reduce the amount of the alkaline component and subsequently burning the plant material. The plant material is selected from rice husk, rice straw, rice bran, straw, tree bark, bagasse, corn, sugarcane, sweet potato, soybean, peanut, cassava, eucalyptus, fern, pineapple, etc.; however, a preferable plant material is rice husk.

The alkaline oxide is one or more oxides selected from the group consisting of sodium oxide, potassium oxide, calcium oxide, and magnesium oxide.

Preferably, the average particle diameter of the silica powder ranges from 3 μm to 7 μm. In a particle size distribution of the silica powder, the amount of particles larger than 10 μm is 15% or less of the entire silica powder, and the amount of particles smaller than 1 μm is 6% or less. The cementitious material containing the silica powder having such an average particle diameter and particle size distribution is suitable for use as a grouting material for a radioactive waste disposal facility.

In the case of the grouting material, just as in the case of the base cement powder, preferably, the average particle diameter of the base cement ranges from 3 μm to 7 μm, the amount of particles larger than 10 μm is 15% or less of the entire base cement, and the amount of particles smaller than 1 μm is 6% or less in a particle size distribution.

Advantageous Effects of Invention

The cementitious material for a radioactive waste disposal facility according to the present invention decreases the pH at an early stage after hardening to thereby have excellent early strength development.

The grouting material for a radioactive waste disposal facility according to the present invention decreases the pH at an early stage after hardening to thereby have excellent early strength development, and also permeates into spaces between microparticles in the ground and cracks in the rock mass.

BRIEF DESCRIPTION OF DRAWINGS

The sole FIGURE illustrates the relationship between the total alkaline oxide contents in silica powder made of rice husk ash and the pH values of hardened cement bodies containing the silica powder at a material age of 14 days.

DESCRIPTION OF EMBODIMENTS

[Properties of Cementitious Material of the Invention]

The cementitious material for a radioactive waste disposal facility according to the present invention has the following properties.

a) The cementitious material includes base cement, and porous and amorphous silica powder.

b) The amount of the silica powder in the entire cementitious material ranges from 35% to 65%.

The cementitious material having the above properties produces the effect of decreasing the pH at an early stage after the cementitious material is hardened and thereby of exhibiting excellent early strength development. This will be described later in detail with various experimental results.

[Properties of Grouting Material of the Invention]

The grouting material for a radioactive waste disposal facility according to the present invention has, in addition to the aforementioned properties a) and b), the following properties c) and d), and more preferably has the following properties e) and f).

c) The average particle diameter of the silica powder ranges from 3 μm to 7 μm.

d) In the particle size distribution of the silica powder, the amount of particles larger than 10 μm is 15% or less of the entire silica powder, and the amount of particles smaller than 1 μm is 6% or less.

e) The average particle diameter of the grouting material powder containing the base cement mixed with the silica powder ranges from 3 μm to 7 μm.

f) In the particle size distribution of the grouting material powder, the amount of particles larger than 10 μm is 15% or less in the entire grouting material, and the amount of particles smaller than 1 μm is 6% or less.

The grouting material having the aforementioned properties produces the effect of decreasing the pH at an early stage after the grouting material is hardened and thereby of exhibiting excellent early strength development, and providing excellent permeability into spaces between microparticles in the ground and cracks in the rock mass. This will be described later in detail with various experimental results.

The aforementioned properties c), d), e), and f) are applicable to especially the grouting material; however, the cementitious material also can possess those properties.

[Types of Prepared Base Cement]

The inventors of this invention prepared four types of base cement, shown in Table 1, to conduct various experiments. The base cement of Type Symbol C1 contained Portland cement clinker and gypsum. The base cement of Type Symbols C2, C3, C4 contained portland cement clinker, blast-furnace slag, and gypsum. The four types of base cement had slightly different particle size distributions from one another. The Portland cement clinker was moderate heat clinker manufactured by NIPPON STEEL & SUMIKIN CEMENT Co., Ltd. The blast-furnace slag was ground granulated blast-furnace slag manufactured by NIPPON STEEL & SUMIKIN CEMENT Co., Ltd. The gypsum is anhydrite produced in Thailand.

TABLE 1

Base cement types

| Type symbol | Cement constituent (%) | | | Particle diameter | | |
| | Portland cement clinker | Blast-furnace slag | Gypsum | Average particle diameter d50 (μm) | Particles over 10 μm (%) | Particles under 1 μm (%) |
| --- | --- | --- | --- | --- | --- | --- |
| C1 | 98 | 0 | 2 | 4.2 | 1.5 | 0.4 |
| C2 | 68 | 30 | 2 | 4.3 | 1.7 | 0.4 |
| C3 | 48 | 50 | 2 | 4.2 | 2.1 | 0.2 |
| C4 | 27 | 71 | 2 | 4.2 | 3.5 | 0.6 |

[Types of Prepared Silica Powder]

The inventors of this invention prepared silica powder shown in Table 2. The prepared silica powder was broadly classified by types: rice husk ash made by burning rice husk which was typical plant waste (Type Symbols: HS1, HS2, HS3, LS1, LS2, SS); fly ash (Type Symbol: FA); silica fume (Type Symbol: SiF); and silica sand (Type Symbol: QS).

Type Symbols HS1, HS2, HS3 were all citric acid-treated rice husk ashes produced by soaking rice husk in a 5% citric acid solution to reduce the impurities, such as alkaline components, and then burning the rice husk in the atmosphere at a temperature from 300° C. to 1100° C. The citric acid is just an example of acid solutions, and any kind of acid solutions capable of reducing the alkaline components contained in plant materials, such as rice husk, can be used. The amount of the alkaline components to be removed can be controlled by changing the acid concentration, the soak time, and the temperature of the acid solution. The citric acid-treated rice husk ashes of Type Symbols HS1, HS2, HS3 were all porous and amorphous, had a $SiO_2$ purity of 95.4%, and contained 0.8% alkaline oxides (sodium oxide, potassium oxide, calcium oxide, magnesium oxide) ($Na_2O + K_2O + CaO + MgO$) in total.

The three types of citric acid-treated rice husk ashes HS1, HS2, HS3 were produced by burning rice husk, pulverizing the rice husk ash, and sizing the pulverized rice husk ash so as to respectively obtain predetermined particle size distributions. The ashes were measured to obtain the average particle diameters, the amounts of particles larger than 10 μm and the amounts of particles smaller than 1 μm in particle size distributions. The particle size distributions were measured by a laser diffraction particle size distribution analyzer (MT-3000II manufactured by NIKKISO CO., LTD).

Type Symbols LS1, LS2 were non-acid-treated rice husk ashes produced by burning rice husk that had not been soaked in an acid solution, in the atmosphere at a temperature from 300° C. to 1100° C. The ashes were porous and amorphous. Because the acid treatment was not conducted, the total alkaline oxide contents were 2.4% and 4.1%, respectively, which were slightly high. In addition, the non-acid-treated rice husk ashes had $SiO_2$ purities of 93.8% and 93.7%, respectively, which were low in comparison with the citric acid-treated rice husk ashes. The burnt rice husk was pulverized and sized so that the resultant rice husk ashes obtained predetermined particle size distributions.

Type Symbol SS was flame-spheroidized rice husk ash produced by subjecting pulverized rice husk ash to a melting-spheroidization treatment in flame at a temperature of 1700° C. or higher. The resultant silica powder was amorphous, but non-porous due to the flame spheroidization treatment. The total alkaline oxide content was 1.6%. The rice husk ash was sized after the spheroidization treatment so as to obtain a predetermined particle size distribution.

Type Symbol FA was fly ash (JIS type-II, manufactured by HOKUDEN KOGYO CO., LTD.), which was non-porous and amorphous. The fly ash has a silica purity as low as 64.1%, and contains 4.1% alkaline oxides in total, which was a high value in comparison with the rice husk ashes. In addition, the average particle diameter was 8.5 μm, which was a high value in comparison with the rice husk ashes.

Type Symbol SiF was silica fume (SF-AN, manufactured by TOMOE ENGINEERING CO., LTD.), which was non-

TABLE 2

Silica powder types

| Type | Type symbol | Porous or not | Amorphous or not | SiO2 purity (%) | Na2O + K2O + CaO + MgO content (%) | Particle diameter | | |
| | | | | | | Average particle diameter d50 (μm) | Particles over 10 μm (%) | Particles under 1 μm (%) |
| --- | --- | --- | --- | --- | --- | --- | --- | --- |
| Citric acid-treated rice husk ash | HS1 | ○ | ○ | 95.4 | 0.8 | 4.3 | 1.3 | 0.2 |
| Citric acid-treated rice husk ash | HS2 | ○ | ○ | 95.4 | 0.8 | 6.3 | 19.7* | 0 |
| Citric acid-treated rice husk ash | HS3 | ○ | ○ | 95.4 | 0.8 | 2.2* | 0 | 8.6* |
| Non-acid-treated rice husk ash | LS1 | ○ | ○ | 93.8 | 2.4 | 4.3 | 1.8 | 0.2 |
| Non-acid-treated rice husk ash | LS2 | ○ | ○ | 93.7 | 4.1 | 4.1 | 3.6 | 0.5 |
| Flame-spheroidized rice husk ash | SS | x | ○ | 97.3 | 1.6 | 4.1 | 1 | 0 |
| Fly ash | FA | x | ○ | 64.1* | 4.1* | 8.5* | 44.1* | 2.1 |
| Silica fume | SiF | x | ○ | 94.6 | 0.1 | 1.8* | 0 | 12.3* |
| Silica sand | QS | x | x | 88.2* | 3.7* | 4.1 | 1.7 | 0 |

*or "x" - value outside the invention porous and amorphous. The total alkaline oxide content was 0.1%, which was a very small value in comparison with the rice husk ashes. The average particle diameter was 1.8 µm, which was a small value in comparison with the rice husk ashes HS1, HS2.

Type Symbol QS was powder produced by pulverizing and sizing silica sand (Tohoku silica sand No. 9), and was non-porous and crystalline. The total alkaline oxide content was 3.7%, which was a high value in comparison with the rice husk ashes.

Table 2 shows values that fall outside a preferable range or do not match preferable conditions by asterisks associated with the value cells. Likewise, the values that fall outside a preferable range or do not match preferable conditions are also shown with asterisks in Tables 3 to 11 below.

[Relationship Between Content Variations of Citric Acid-Treated Rice Husk Ash and Properties]

With the citric acid-treated rice husk ash of Type HS1, cementitious materials, or grouting materials, were examined for the hardening state, pH, and permeability while the percentage of the silica powder content (replacement ratio of silica) in the entire cementitious material was changed to 0%, 20%, 30%, 40%, 50%, 60%, 70%, and 80%. The results are shown in Table 3.

TABLE 3

Relationship between content variations of citric acid-treated rice husk ash (total alkaline oxide content of 0.8%) and properties

| Type symbol | Silica replacement ratio (%) | Base cement types | Hardening state | pH | Permeability (cm) |
|---|---|---|---|---|---|
| HS1 | 0 | C4 | Hardened | 12.7* | 15 |
| HS1 | 20 | C4 | Hardened | 11.8* | 15 |
| HS1 | 30 | C4 | Hardened | 11.5* | 15 |
| HS1 | 40 | C4 | Hardened | 10.3 | 15 |
| HS1 | 50 | C4 | Hardened | 10.5 | 15 |
| HS1 | 60 | C4 | Hardened | 10.5 | 3* |
| HS1 | 70 | C4 | Unhardened* | Unmeasurable* | —* |
| HS1 | 80 | C4 | Unhardened* | Unmeasurable* | —* |

*value outside the invention

The measurement of pH was conducted as described below. A suspension with a water-cement ratio of 100% and containing a 1% dispersant additive (ML-3000 manufactured by NIPPON STEEL & SUMIKIN CEMENT Co., Ltd.) was prepared. The suspension was cured in a laboratory at 20° C. for 24 hours while being shaken to avoid separation, and then cured in water of 50° C. for 14 days. Subsequently, the hardened body after curing was pulverized and shaken in ion-exchange water with a solid-liquid ratio of 1:5 for 72 hours, and then the pH was measured.

A permeability test was conducted as described below. A mixed cement made up of cement and a siliceous material was immersed into a solution containing a dispersant (ML-3000 manufactured by NIPPON STEEL & SUMIKIN CEMENT Co., Ltd.) in an amount of 2% by mass of the mixed cement, and the mixed cement in the solution was agitated and mixed at 6000 rpm for 3 minutes to produce a suspension with a water-cement ratio of 400%. Then, Toyoura silica sand (produced in Toyoura district in Yamaguchi prefecture) was such measured that when the silica sand was charged into a test device made by machining an acrylic pipe with a diameter of 55 mm, the silica sand forms a saturated sand layer with a thickness of 15 cm and a porosity of 45%. While 500 ml of the produced suspension was poured from above to the test device, a faucet at a lower part of the device was opened to allow the suspension to permeate the silica sand, and then the length of the sand layer with the suspension permeated was measured.

The citric acid-treated rice husk ash HS1 used herein contained 0.8% alkaline oxides in total, had an average particle diameter of 4.3 µm, and included 1.3% particles larger than 10 µm, and 0.2% particles smaller than 1 µm in the particle size distribution.

The results in Table 3 show the following points.

a) The cementitious material or grouting material having a silica replacement ratio (silica content) of 70% or greater does not harden.

b) The cementitious material or grouting material having a silica replacement ratio of 30% or less has a pH greater than 11.

c) The cementitious material or grouting material having a silica replacement ratio ranging from 40% to 60% has a pH ranging from 10.3 to 10.5.

d) The cementitious material or grouting material having a silica replacement ratio of 60% or greater has poor permeability.

The aforementioned points suggest that the silica replacement ratio needs to be set at 35% to 65% to obtain a low-alkali (below pH 11) cementitious material using rice husk ash containing 0.8% alkaline oxides in total.

Even though the citric acid-treated rice husk ash HS1 was adjusted so as to have an appropriate particle size distribution, the permeability was deteriorated when the silica replacement ratio was 60% or greater. Therefore, the silica replacement ratio preferably needs to be set at 35% to 55% to obtain a low-alkali (below pH 11) grouting material with good permeability.

[Relationship Between Content Variations of Non-Acid-Treated Rice Husk Ash and Properties]

With the non-acid-treated rice husk ash of Type LS1, cementitious materials, or grouting materials, were examined for the hardening state, pH, and permeability while the percentage of the silica powder content (replacement ratio of silica) in the entire cementitious material was changed to 0%, 20%, 30%, 40%, 50%, 60%, 70%, and 80%. The results are shown in Table 4.

TABLE 4

Relationship between content variations of non-acid-treated rice husk ash (total alkaline oxide content of 2.4%) and the properties

| Type symbol | Silica replacement ratio (%) | Base cement types | Hardening state | pH | Permeability (cm) |
|---|---|---|---|---|---|
| LS1 | 0 | C4 | Hardened | 12.7* | 15 |
| LS1 | 20 | C4 | Hardened | 11.9* | 15 |
| LS1 | 30 | C4 | Hardened | 11.5* | 15 |
| LS1 | 40 | C4 | Hardened | 11.3* | 15 |
| LS1 | 50 | C4 | Hardened | 11.2* | 15 |
| LS1 | 60 | C4 | Hardened | 11 | 2* |
| LS1 | 70 | C4 | Unhardened* | Unmeasurable* | —* |
| LS1 | 80 | C4 | Unhardened* | Unmeasurable* | —* |
| LS1 | 50 | C1 | Hardened | 10.8 | 15 |

*value outside the invention

The non-acid-treated rice husk ash LS1 used herein contained 2.4% alkaline oxides in total, had an average particle diameter of 4.3 µm, and included 1.8% particles larger than 10 µm and 0.2% particles smaller than 1 µm in the particle size distribution.

The results in Table 4 show the following points.

a) In the case where the cementitious material or grouting material is made up with the base cement C4, the cementitious material or grouting material has a pH of 11 or greater regardless of what range the silica replacement ratio (silica content) is set to.

b) However, if the silica replacement ratio of the cementitious material or grouting material containing the base cement C4 is set to 40% or greater, the pH value can be lowered to 11.3 or less.

c) In the case where the cementitious material or grouting material is made up with the base cement C1, the cementitious material or grouting material can have a pH of 11 or less on the condition that the silica replacement ratio is set to 50% or greater.

d) The cementitious material or grouting material having a silica replacement ratio of 60% or greater has poor permeability.

The aforementioned points suggest that the cementitious material containing the base cement C4 and non-acid-treated rice husk ash with 2.4% alkaline oxides in total have difficulty in reducing the alkalinity if the silica replacement ratio is set to 30% or lower; however, setting the silica replacement ratio to 40% or higher can probably produce a low-alkali cementitious material having a pH of 11.3 or less. In the case of the base cement C1, setting the silica replacement ratio to 50% or greater can probably produce a low-alkali cementitious material having a pH of 11 or less.

[Relationship Between Content Variations of Flame-Spheroidized Rice Husk Ash and Properties]

With the flame-spheroidized rice husk ash of Type SS, cementitious materials, or grouting materials, were examined for the hardening state, pH, and permeability while the percentage of the silica powder content (replacement ratio of silica) in the entire cementitious material was changed to 0%, 20%, 30%, 40%, 50%, 60%, 70%, and 80%. The results are shown in Table 5.

TABLE 5

Relationship between content variations of flame-spheroidized rice husk ash (total alkaline oxide content of 1.6%) and properties

| Type symbol | Silica replacement ratio (%) | Base cement types | Hardening state | pH | Permeability (cm) |
|---|---|---|---|---|---|
| SS | 0 | C4 | Hardened | 12.7* | 15 |
| SS | 20 | C4 | Hardened | 12.4* | 15 |
| SS | 30 | C4 | Hardened | 12.3* | 15 |
| SS | 40 | C4 | Hardened | 12.2* | 15 |
| SS | 50 | C4 | Hardened | 11.8* | 15 |
| SS | 60 | C4 | Hardened | 11.4* | 15 |
| SS | 70 | C4 | Unhardened* | Unmeasurable* | —* |
| SS | 80 | C4 | Unhardened* | Unmeasurable* | —* |

*value outside the invention

The flame-spheroidized rice husk ash SS used herein contained 1.6% alkaline oxides in total, had an average particle diameter of 4.1 μm, and included 1.0% particles larger than 10 μm and 0% particles smaller than 1 μm in the particle size distribution.

The results in Table 5 show the following points.

a) The cementitious material or grouting material has a pH greater than 11 regardless of what range the silica replacement ratio (silica content) is set to.

b) The cementitious material or grouting material made up with the flame-spheroidized rice husk ash SS has a pH value greater than that of the non-acid-treated rice husk ash LS (total alkaline oxide content was 2.4%).

c) The cementitious material or grouting material containing spherical silica particles that include 1% particles larger than 10 μm and 0% particles smaller than 1 μm in the particle size distribution exhibits excellent permeability even if the silica replacement ratio is 60%.

The aforementioned points suggest that factors responsible for the reduction of pH include not only the total alkaline oxide content in the silica powder, but also the porosity of the particles.

[Relationship Between Content Variations of Silica Fume and Properties]

With the silica fume of Type SiF, cementitious materials, or grouting materials, were examined for the hardening state, pH, and permeability while the percentage of the silica powder content (replacement ratio of silica) in the entire cementitious material was changed to 0%, 20%, 30%, 40%, 50%, 60%, 70%, and 80%. The results are shown in Table 6.

TABLE 6

Relationship between content variations of silica fume (total alkaline oxide content of 0.1%) and properties

| Type symbol | Silica replacement ratio (%) | Base cement types | Hardening state | pH | Permeability (cm) |
|---|---|---|---|---|---|
| SiF | 0 | C4 | Hardened | 12.7* | 15 |
| SiF | 20 | C4 | Hardened | 12.6* | 11* |
| SiF | 30 | C4 | Hardened | 11.7* | 5* |
| SiF | 40 | C4 | Hardened | 11.6* | 3* |
| SiF | 50 | C4 | Hardened | 11.5* | 1* |
| SiF | 60 | C4 | Hardened | 11.3* | 1* |
| SiF | 70 | C4 | Hardened | 11.1* | 1* |
| SiF | 80 | C4 | Unhardened* | Unmeasurable* | —* |

*value outside the invention

The silica fume SiF used herein contained 0.1% alkaline oxides in total, had an average particle diameter of 1.8 μm, and included 0% particles larger than 10 μm and 12.3% particles smaller than 1 μm in the particle size distribution.

The results in Table 6 show the following points.

a) The cement-based material or grout material has a pH greater than 11 regardless of what range the silica replacement ratio (silica content) is set to.

b) The cementitious material or grouting material having a silica replacement ratio of 20% or greater has poor permeability.

The aforementioned points suggest that the cementitious material or grouting material containing the silica fume has difficulty in reducing pH. This is probably because the non-porous silica fume reacts poorly with calcium hydroxide in spite of the fact that the silica fume has a high $SiO_2$ purity and contains a very low total content of alkaline oxides. This also suggests that the use of porous silica powder is necessary to reduce pH at early stages after the cementitious material or grouting material is hardened.

In addition, the poor permeability of the cementitious material or grouting material containing the silica fume is probably caused by the excessive amount of particles smaller than 1 μm, which is 12.3%. The excessive ultrafine particles probably have failed to disperse sufficiently and agglomerated while moving in the suspension.

[Relationship Between Content Variations of Fly Ash and Properties]

With the fly ash of Type FA, cementitious materials, or grouting materials, were examined for its hardening state, pH, and permeability while the percentage of the silica powder content (replacement ratio of silica) in the entire cementitious material was changed to 0%, 20%, 30%, 40%, 50%, 60%, 70%, and 80%. The results are shown in Table 7.

TABLE 7

Relationship between content variations of fly ash (total alkaline oxide content of 4.1%) and properties

| Type symbol | Silica replacement ratio (%) | Base cement types | Hardening state | pH | Permeability (cm) |
|---|---|---|---|---|---|
| FA | 0 | C4 | Hardened | 12.7* | 15 |
| FA | 20 | C4 | Hardened | 12.7* | 10* |
| FA | 30 | C4 | Hardened | 12.6* | 5* |
| FA | 40 | C4 | Hardened | 12.5* | 2* |
| FA | 50 | C4 | Hardened | 12.5* | 0* |
| FA | 60 | C4 | Hardened | 12.3* | 0* |
| FA | 70 | C4 | Hardened | 12* | 0* |
| FA | 80 | C4 | Unhardened* | Unmeasurable* | —* |

*value outside the invention

The fly ash FA used herein contained 4.1% alkaline oxides in total, had an average particle diameter of 8.5 μm, and included 44.1% particles larger than 10 μm and 2.1% particles smaller than 1 μm in the particle size distribution.

The results in Table 7 show the following points.

a) The cement-based material or grout material has a pH greater than 12 regardless of what range the silica replacement ratio (silica content) is set to.

b) The cementitious material or grouting material having a silica replacement ratio of 20% or greater has poor permeability.

The aforementioned points suggest that the cementitious material or grouting material made up with the fly ash has high pH values probably due to the high total alkaline oxide content, which is 4.1%, the low $SiO_2$ purity, and the non-porous structure.

In addition, the poor permeability of the cementitious material or grouting material containing the fly ash is probably because the average particle diameter is as large as 8.5 μm, and the amount of particles larger than 10 μm is as great as 44.1% in the particle size distribution.

[Property Variations Due to the Change of Base Cement Type]

Cementitious materials or grouting materials were prepared with the citric acid-treated rice husk ash HS1 (total alkaline oxide content of 0.8%, average particle diameter of 4.3 μm, amount of particles larger than 10 μm of 1.3%, amount of particles smaller than 1 μm of 0.2% in the particle size distribution) and different types of base cement, and the resulting cementitious materials or grouting materials were examined for the hardening state, pH, and permeability. The silica replacement ratio was set to 50% for all the cementitious materials or grouting materials. The results are shown in Table 8.

TABLE 8

Relationship between base cement type and properties (citric acid-treated rice husk ash was used)

| Silica powder type | Silica replacement ratio (%) | Base cement types | Hardening state | pH | Permeability (cm) |
|---|---|---|---|---|---|
| HS1 | 50 | C1 | Hardened | 10.7 | 15 |
| HS1 | 50 | C2 | Hardened | 10.9 | 15 |
| HS1 | 50 | C3 | Hardened | 10.9 | 15 |
| HS1 | 50 | C4 | Hardened | 10.5 | 15 |

As is apparent from the results in Table 8, the hardening state, pH, and permeability hardly changed even if the base cement type was changed.

[Relationship Between Particle Diameter of Silica Powder and Properties]

Cementitious materials or grouting materials containing the citric acid-treated rice husk ash HS1, HS2, or HS3 (total content of alkaline oxides of 0.8%) were examined for how the different particle size distributions change the hardening state, pH, and permeability.

The citric acid-treated rice husk ash HS1 has an average particle diameter of 4.3 μm, and contains 1.3% particles larger than 10 μm and 0.2% particles smaller than 1 μm in the particle size distribution.

The citric acid-treated rice husk ash HS2 has an average particle diameter of 6.3 μm, and contains 19.7% particles larger than 10 μm and 0% particles smaller than 1 μm in the particle size distribution.

The citric acid-treated rice husk ash HS3 has an average particle diameter of 2.2 μm, and contains 0% particles larger than 10 μm and 8.6% particles smaller than 1 μm in the particle size distribution.

The results are shown in Table 9.

TABLE 9

Relationship between particle diameter of silica powder and properties (citric acid-treated rice husk ash was used)

| Silica powder type | Silica replacement ratio (%) | Base cement types | Hardening state | pH | Permeability (cm) |
|---|---|---|---|---|---|
| HS1 | 50 | C4 | Hardened | 10.5 | 15 |
| HS2 | 50 | C4 | Hardened | 11.2* | 2* |
| HS3 | 50 | C4 | Hardened | 10.4 | 2* |

*value outside the invention

The results in Table 9 show the following points.

a) Only the cementitious material or grouting material that contains HS2 whose average particle diameter and amount of particles larger than 10 μm in the particle size distribution are the largest has a pH greater than 11.

b) Only the cementitious material or grouting material that contains HS1 has good permeability, while the cementitious materials or grouting materials that contain HS2 or HS3 have poor permeability.

The aforementioned points suggest that the ashes having too large average particle diameters and including a lot of large-diameter particles have a small specific surface area that probably deteriorates the reactivity and thereby deteriorates the capability of accelerating pH reduction.

The excessively large average particle diameters and the high content of large diameter particles may deteriorate the permeability, while the excessively small average particle diameters may cause the agglomeration of the ultrafine particles, thereby deteriorating the permeability.

A preferable average particle diameter and particle size distribution to achieve excellent permeability will be derived from the results in Table 9 and other tables that have been already described.

First, when attention focuses on the average particle diameter of the silica powder, poor permeability is seen in the fly ash with an average particle diameter of 8.5 μm, the citric acid-treated rice husk ash HS3 with an average particle diameter of 2.2 μm, and the silica fume with an average particle diameter of 1.8 μm. Although the citric acid-treated rice husk ash HS2 having an average particle diameter of 6.3 μm has poor permeability, this is probably because the amount of particles larger than 10 μm is 19.7% in the particle size distribution. From those observations, a preferable average particle diameter range is from 3 μm to 7 μm, and more preferably from 3.5 μm to 6.5 μm.

The citric acid-treated rice husk ash HS2 in which 19.7% of particles are greater than 10 μm in the particle size distribution has poor permeability. It is therefore necessary to reduce the amount of particles larger than 10 μm to 15% or lower. More preferably, the amount needs to be reduced to 10% or lower.

The citric acid-treated rice husk ash HS3 in which 8.6% of particles are smaller than 1 μm in the particle size distribution has poor permeability. It is therefore necessary to reduce the amount of particles smaller than 1 μm to 6% or lower. More preferably, the amount needs to be reduced to 2% or lower.

[Preferable Particle Diameter and Particle Size Distribution of Grouting Material Powder]

As shown in Table 1, the following are the particle diameters and particle size distributions of the base cements used in the experiments.

Average particle diameter: 4.2 μm to 4.3 μm

Amount of particles larger than 10 μm in the particle size distribution: 1.5% to 3.5%

Amount of particles smaller than 1 μm in the particle size distribution: 0.2% to 0.6%

If the particle diameter and particle size distribution of a base cement are in the above range, the base cement probably does not have any problem in terms of the permeability. If the base cement is intended to be used in a grouting material, the particle diameter and particle size distribution of the grouting material powder with the base cement mixed with silica powder are desired to meet the following conditions just as the silica powder does.

Average particle diameter: 3 μm to 7 μm

Amount of particles larger than 10 μm in the particle size distribution: 15% or less Amount of particles smaller than 1 μm in the particle size distribution: 6% or less

[Comparison Between Citric Acid-Treated Rice Husk Ash and Silica Sand]

A cementitious material containing citric acid-treated rice husk ash HS1 and a cementitious material containing silica sand QS were compared for the hardening state, pH, and permeability. The silica replacement ratio was set to 50%. The results are shown in Table 10.

TABLE 10

Comparison between citric acid-treated rice husk ash HS1 and silica sand QS

| Silica powder type | Silica replacement ratio (%) | Base cement types | Hardening state | pH | Permeability (cm) |
|---|---|---|---|---|---|
| HS1 | 50 | C4 | Hardened | 10.5 | 15 |
| QS | 50 | C4 | Hardened | 12.6* | 15 |

*value outside the invention

The cementitious material containing the citric acid-treated rice husk ash HS1 exhibited excellent results for all items: the hardening state, pH, and permeability. The cementitious material containing the silica sand QS also exhibited excellent results for the hardening state and permeability, but the pH exceeded 12. This is probably because the silica sand is non-porous and crystalline, and the total content of alkaline oxides is as high as 3.7%.

The excellent permeability of the silica sand QS is probably derived from its appropriate particle size distribution, that is, the average particle diameter is 4.1 μm, the amount of particles larger than 10 μm is 1.7%, and the amount of particles smaller than 1 μm is 0%.

[Relationship Between Type of Silica Powder and Compressive Strength]

With different types of silica powder, the compressive strength at a material age of 3 days, 7 days, and 14 days was examined. The silica powder used was citric acid-treated rice husk ash HS1, silica fume SiF, and fly ash. The silica replacement ratio was set to 50%.

The compressive strength was measured as described below. A mortar with a water-cement ratio of 65% and a cement-sand ratio of 1:2 was molded in a mold of 4×4×16 cm, and cured at 20° C. temperature and 90% relative humidity for 24 hours. Then the mortar removed from the mold was cured under water of 20° C. until it reaches predetermined ages. The compressive strength of the different aged mortar was measured in conformance with JIS R 5201.

The results are shown in Table 11.

TABLE 11

Relationship between silica powder type and compressive strength

| | | | Compressive strength (MPa) | | |
|---|---|---|---|---|---|
| Silica powder type | Silica replacement ratio (%) | Base cement types | material age of 3 days | material age of 7 days | material age of 14 days |
| HS1 | 50 | C4 | 10.4 | 14.9 | 19.9 |
| SiF | 50 | C4 | 2.25* | 10.8* | 17.7 |
| FA | 50 | C4 | 2.97* | 10.5* | 20.4 |

*value outside the invention

The mortar containing the citric acid-treated rice husk ash HS1 is remarkably high in early strength at 3 days in comparison with the silica fume SiF and fly ash FA. The differences become smaller at 7 days, but the mortar containing the citric acid-treated rice husk ash HS1 still has a high strength. When the material age is 14 days and more, the differences in compressive strength among them are hardly seen.

These results clearly show that the materials containing the silica fume and fly ash have poor early strength properties. It is also clear that the material containing the citric acid-treated rice husk ash has superior early strength properties.

[Proper Total Alkaline Oxide Content in Silica Powder]

The relationships between the total alkaline oxide contents in rice husk ash and the pH values at a material age of 14 days were examined. The results are shown in the sole FIGURE.

When the total alkaline oxide contents in the silica powder mixed with the base cement C4 are 0.77%, 2.35%, 3.40%, and 4.14%, the respective pH values are 10.5, 11.2, 11.4, and 11.7. When the total alkaline oxide contents in the silica powder mixed with the base cement C1 are 0.77%, 2.35%, and 4.14%, the respective pH values are 10.7, 10.8, and 11.0. The sole FIGURE shows that the total alkaline oxide content is preferably 4.1% or lower to reduce the pH of the 14 days-old material to below 11. More preferably, the total alkaline oxide content is 3.0% or lower, further preferably, the content is 2.0% or lower, and still further preferably, the content is 1.6% or lower.

It should be understood that although the present invention has been described in the embodiment, the invention is not limited thereto and various modifications and changes may be made within the scope of the appended claims and their equivalents.

INDUSTRIAL APPLICABILITY

This invention can be advantageously utilized as a cementitious material or a grouting material for a radioactive waste disposal facility.

The invention claimed is:

1. A cementitious material for a radioactive waste disposal facility comprising:
   base cement; and porous and amorphous silica powder, wherein
   the amount of the silica powder in the entire cementitious material ranges from 35% to 65% on a mass basis,
   the silica powder has an average particle diameter ranging from 3 μm to 7 μm, and
   in a particle size distribution of the silica powder, an amount of particles larger than 10 μm is 15% or less in the entire silica powder, and an amount of particles smaller than 1 μm is 6% or less.

2. The cementitious material for a radioactive waste disposal facility according to claim 1, wherein
   the silica powder contains an alkaline oxide, and
   a total alkaline oxide content in the entire silica powder is 4.1% or lower on a mass basis.

3. The cementitious material for a radioactive waste disposal facility according to claim 1, wherein
   the silica powder has a silica purity of 93% or higher on a mass basis.

4. The cementitious material for a radioactive waste disposal facility according to claim 1, wherein
   the silica powder is made by pulverizing ash of burnt plant material.

5. The cementitious based material for a radioactive waste disposal facility according to claim 1, wherein
   the silica powder is ash made by soaking a plant material in an acid solution and then burning the plant material.

6. The cementitious material for a radioactive waste disposal facility according to claim 4, wherein
   the plant material is rice husk.

7. The cementitious material for a radioactive waste disposal facility according to claim 2, wherein
   the alkaline oxide includes one or more oxides selected from the group consisting of sodium oxide, potassium oxide, calcium oxide, and magnesium oxide.

8. The cementitious material for a radioactive waste disposal facility according to claim 1, wherein
   the cementitious material is a grouting material for the radioactive waste disposal facility, the grouting material comprising a grouting material powder containing the base cement mixed with the silica powder.

9. The cementitious material for a radioactive waste disposal facility according to claim 8, wherein
   the grouting material powder has an average particle diameter ranging from 3 μm to 7 μm, and
   in a particle size distribution of the grouting material powder, an amount of particles larger than 10 μm is 15% or less in the entire grouting material, and an amount of particles smaller than 1 μm is 6% or less.

* * * * *